United States Patent
Alexander et al.

(10) Patent No.: US 12,301,555 B2
(45) Date of Patent: May 13, 2025

(54) AUTOMATING RESPONSES TO AUTHENTICATION REQUESTS USING UNSUPERVISED COMPUTER LEARNING TECHNIQUES

(71) Applicant: salesforce.com, inc., San Francisco, CA (US)

(72) Inventors: Joshua David Alexander, Austin, TX (US); Seth Holloway, Austin, TX (US); Alexa Staudt, Atlanta, GA (US); Ian Michael Glazer, Washington, DC (US); William C. Mortimore, Jr., San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 17/461,303

(22) Filed: Aug. 30, 2021

(65) Prior Publication Data
US 2022/0060465 A1    Feb. 24, 2022

Related U.S. Application Data

(63) Continuation of application No. 16/025,885, filed on Jul. 2, 2018, now Pat. No. 11,108,764.

(51) Int. Cl.
*H04W 12/06* (2021.01)
*G06N 5/02* (2023.01)
(Continued)

(52) U.S. Cl.
CPC .......... *H04L 63/0815* (2013.01); *G06N 5/02* (2013.01); *H04L 63/0853* (2013.01);
(Continued)

(58) Field of Classification Search
CPC ............. H04L 63/0815; H04L 63/0853; H04L 63/0884; H04L 63/083; H04L 2463/082; H04W 12/64; H04W 12/06; G06N 5/02
See application file for complete search history.

(56) References Cited

U.S. PATENT DOCUMENTS 5,950,207 A    9/1999  Mortimore et al.
5,963,646 A   10/1999  Fielder et al.
(Continued)

FOREIGN PATENT DOCUMENTS

DE        2259178 A1    7/1973

OTHER PUBLICATIONS

Google 2-step Verification, Article published Dec. 20, 2013 as verified by Internet Archive (4 pages); http://web.archive.org/web/20131220004531/http://www.google.com/landing/2step/#tab-why-you-need-it/ [Retrieved Apr. 23, 2018].
(Continued)

*Primary Examiner* — Sarah Su
*Assistant Examiner* — Vladimir I Gavrilenko
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to automating authentication decisions for a multi-factor authentication scheme based on computer learning. In disclosed embodiments, a mobile device receives a first request corresponding to a factor in a first multi-factor authentication procedure. Based on user input approving or denying the first request, the mobile device sends a response to the first request and stores values of multiple parameters associated with the first request. The mobile device receives a second request corresponding to a factor in a second multi-factor authentication procedure where the second request is for authentication for a different
(Continued)

account than the first request. The mobile device automatically generates an approval response to the second request based on performing a computer learning process on inputs that include values of multiple parameters for the second request and the stored values of the multiple parameters associated with the first request. The approval response is automatically generated and sent without receiving user input to automate the second request.

20 Claims, 5 Drawing Sheets

(51) Int. Cl.
*H04L 9/40* (2022.01)
*H04W 12/64* (2021.01)

(52) U.S. Cl.
CPC ......... *H04L 63/0884* (2013.01); *H04W 12/06* (2013.01); *H04W 12/64* (2021.01); *H04L 63/083* (2013.01); *H04L 2463/082* (2013.01)

(56) References Cited

U.S. PATENT DOCUMENTS

| | | | |
|---|---|---|---|
| 5,995,624 | A | 11/1999 | Fielder et al. |
| 6,049,612 | A | 4/2000 | Fielder et al. |
| 6,105,133 | A | 8/2000 | Fielder et al. |
| 7,104,444 | B2 | 9/2006 | Suzuki |
| 7,548,886 | B2 | 6/2009 | Kirkland et al. |
| 7,669,760 | B1 | 3/2010 | Zettner |
| 7,801,304 | B1 | 9/2010 | Harvey et al. |
| 7,805,749 | B1 | 9/2010 | Harvey et al. |
| 7,860,131 | B1 | 12/2010 | Harvey et al. |
| 7,908,638 | B1 | 3/2011 | Harvey et al. |
| 8,155,948 | B2 | 4/2012 | Ruano et al. |
| 8,607,322 | B2 | 12/2013 | Hinton et al. |
| 8,627,438 | B1 | 1/2014 | Bhimanaik |
| 8,806,567 | B1 | 8/2014 | Venable, Sr. |
| 8,955,063 | B2 | 2/2015 | Shibuya |
| 10,705,860 | B2 | 7/2020 | Koren et al. |
| 10,726,491 | B1 * | 7/2020 | Hockey ............... H04L 63/1433 |
| 10,812,476 | B2 | 10/2020 | Alexander |
| 11,108,764 | B2 * | 8/2021 | Alexander ............ H04W 12/06 |
| 11,416,784 | B2 * | 8/2022 | Ibrahim ................ H04W 4/024 |
| 2003/0182194 | A1 | 9/2003 | Choey et al. |
| 2006/0136334 | A1 | 6/2006 | Atkinson et al. |
| 2006/0282500 | A1 | 12/2006 | Kiuchi et al. |
| 2007/0055878 | A1 | 3/2007 | Sandhu et al. |
| 2007/0174082 | A1 | 7/2007 | Singh |
| 2009/0172402 | A1 | 7/2009 | Tran |
| 2010/0006642 | A1 | 1/2010 | Boutcher et al. |
| 2010/0100454 | A1 | 4/2010 | Sines et al. |
| 2010/0174649 | A1 | 7/2010 | Bouchard |
| 2010/0217880 | A1 | 8/2010 | Venezia et al. |
| 2010/0293598 | A1 | 11/2010 | Collart et al. |
| 2010/0299529 | A1 | 11/2010 | Fielder |
| 2011/0007901 | A1 | 1/2011 | Ikeda et al. |
| 2011/0047597 | A1 | 2/2011 | Mahaffey et al. |
| 2011/0142234 | A1 | 6/2011 | Rogers |
| 2011/0202466 | A1 | 8/2011 | Carter |
| 2011/0219230 | A1 | 9/2011 | Oberheide et al. |
| 2011/0307699 | A1 | 12/2011 | Fielder |
| 2011/0307705 | A1 | 12/2011 | Fielder |
| 2011/0307706 | A1 | 12/2011 | Fielder |
| 2011/0307707 | A1 | 12/2011 | Fielder |
| 2011/0312278 | A1 | 12/2011 | Matsushita et al. |
| 2011/0314281 | A1 | 12/2011 | Fielder |
| 2012/0066745 | A1 | 3/2012 | Wuthnow et al. |
| 2012/0068812 | A1 | 3/2012 | Yamamoto et al. |
| 2012/0096277 | A1 | 4/2012 | Perez Soria |
| 2012/0110329 | A1 | 5/2012 | Brown et al. |
| 2012/0144468 | A1 | 6/2012 | Pratt et al. |
| 2012/0158821 | A1 | 6/2012 | Barros |
| 2012/0159591 | A1 | 6/2012 | Payne et al. |
| 2012/0280784 | A1 | 11/2012 | Gaviria Velez et al. |
| 2013/0191884 | A1 | 7/2013 | Leicher et al. |
| 2014/0189808 | A1 | 7/2014 | Mahaffey et al. |
| 2014/0378063 | A1 | 12/2014 | Nathwani et al. |
| 2015/0286813 | A1 | 10/2015 | Jakobsson |
| 2015/0347734 | A1 * | 12/2015 | Beigi ................... H04L 9/3268 726/28 |
| 2015/0347959 | A1 | 12/2015 | Skaaksrud |
| 2016/0283933 | A1 | 9/2016 | Orlando et al. |
| 2016/0378843 | A1 | 12/2016 | Cherwonka et al. |
| 2017/0206365 | A1 | 7/2017 | Garcia et al. |
| 2018/0004079 | A1 | 1/2018 | Chen et al. |
| 2018/0293393 | A1 * | 10/2018 | Effendi ................... G06F 21/32 |
| 2019/0036932 | A1 * | 1/2019 | Bathen ................ H04L 63/0428 |
| 2019/0238532 | A1 | 8/2019 | Alexander et al. |
| 2019/0327230 | A1 | 10/2019 | Wong et al. |
| 2020/0007532 | A1 | 1/2020 | Alexander et al. |
| 2020/0007535 | A1 * | 1/2020 | Barhudarian ......... H04L 67/146 |
| 2020/0033011 | A1 | 1/2020 | Deal et al. |
| 2020/0099682 | A1 | 3/2020 | Alexander et al. |
| 2020/0099683 | A1 | 3/2020 | Alexander et al. |
| 2020/0099696 | A1 | 3/2020 | Alexander et al. |
| 2020/0234605 | A1 * | 7/2020 | Shuart ................... G06F 21/316 |
| 2020/0280552 | A1 | 9/2020 | Alexander et al. |
| 2020/0311285 | A1 | 10/2020 | Jochems |
| 2021/0297258 | A1 * | 9/2021 | Keith, Jr. .............. H04L 9/0866 |

OTHER PUBLICATIONS

Office Action in U.S. Appl. No. 17/649,479 mailed Jan. 19, 2024, 17 pages.

Office Action in U.S. Appl. No. 17/649,479 mailed Jun. 11, 2024, 19 pages.

* cited by examiner

AUTOMATING RESPONSES TO AUTHENTICATION REQUESTS USING UNSUPERVISED COMPUTER LEARNING TECHNIQUES

PRIORITY CLAIM

The present application is a continuation of U.S. application Ser. No. 16/025,885, filed Jul. 2, 2018, which is incorporated by reference herein in its entirety.

BACKGROUND

Technical Field

Embodiments described herein relate to multi-factor authentication and, in particular, to automating responses, on a mobile device, to one or more authentication requests.

Description of the Related Art

Security of user information in accessing private accounts or services is an ongoing problem for individuals attempting to access these accounts/services on the internet. Recent multi-factor authentication schemes have increased security for user information. In addition to the traditionally required username and password to be input by the user, multi-factor authentication procedures include an additional factor, e.g., to show that a user is in possession of a known device such as a cell phone.

DETAILED DESCRIPTION

Figure 1A:
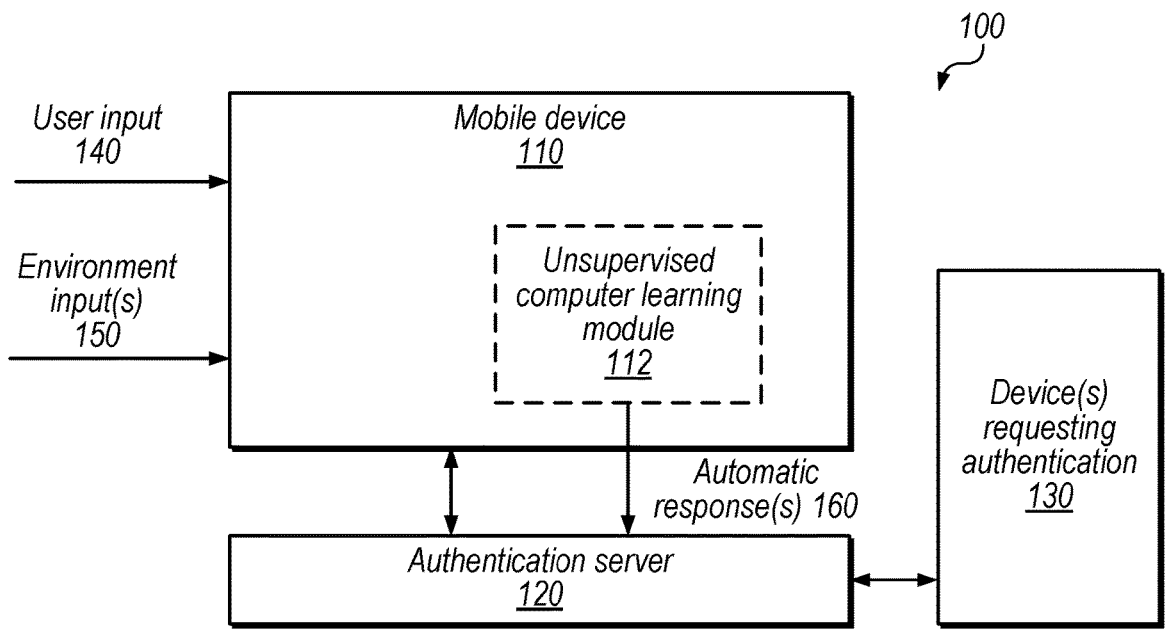
FIGS. 1A and 1B are diagrams illustrating exemplary communication between a mobile device and an authentication server in a multi-factor authentication procedure involving automated authentication decisions based on an unsupervised computer learning process, according to some embodiments.

Multi-factor authentication schemes are often used by online service providers in an attempt to accurately identify account owners and other users of their online services. For example, one factor may relate to knowledge (e.g., user knowledge of a password). Another example factor may relate to possession (e.g., of a device used to receive a separate code out-of-band). Another example factor may relate to inherency (e.g., a property of a device or user). Multiple factors of a given type (e.g., multiple possession factors that are determined using different devices or techniques) may be used for a given multi-factor authentication procedure.

As discussed above, one form of multi-factor authentication involves contacting a secondary computing device (e.g., a mobile device) that the user registers with the account upon new account creation. For example, a user may enter typical account credentials (e.g., user identification and password) into an account sign-in user interface (UI) and if the credentials are valid, the server sends a code (e.g., via a short message service) to the registered mobile device (e.g., a mobile phone, tablet computer, wearable device, or other similar device). In this example, the user reads the code from the mobile device and enters it into the UI of the online service. In some embodiments, the use of multi-factor authentication increases the level of security for a user account/service. However, although multi-factor authentication schemes may increase the level of security for user accounts/services, they may decrease the ease of access for any individual attempting to access one or more private accounts/services.

Therefore, in some embodiments, a computer learning process is used to automate authentication decisions for one or more factors in multi-factor authentication schemes to improve ease of access while maintaining a high level of security for user accounts/services. As one example, a previously authorized mobile device receives a request for a factor in a multi-factor authentication procedure for an account. In this example, without receiving user input concerning automating responses, an unsupervised computer learning module on the previously-authorized mobile device automates a response to the authentication request based on multiple different parameters received and/or stored on the mobile device. In some embodiments, a computer learning module implements one of the following to perform various functionality described herein: neural networks, ensemble learning, supervised learning, unsupervised learning, deep learning, machine learning, recursive self-improvement, etc.

Various embodiments of an unsupervised computer learning module are presented herein. The disclosed embodiments may be used in a stand-alone manner or as one automation method for authentication in a multi-factor authentication scheme in order to provide increased security as well as ease of use over other techniques. The disclosed embodiments may, for example, be combined with other computer learning techniques to provide automation of decisions in multi-factor authentication schemes, including at-least-partially unsupervised techniques that allow for user input in certain scenarios. One example of user input includes decisions for values output from a computer learning module that are within a threshold of a desirable target output space (see FIG. 3 description), which may further allow inclusion of other output values within the threshold in future automation decisions by a computer learning module for multi-factor authentication procedures.

Figure 3:
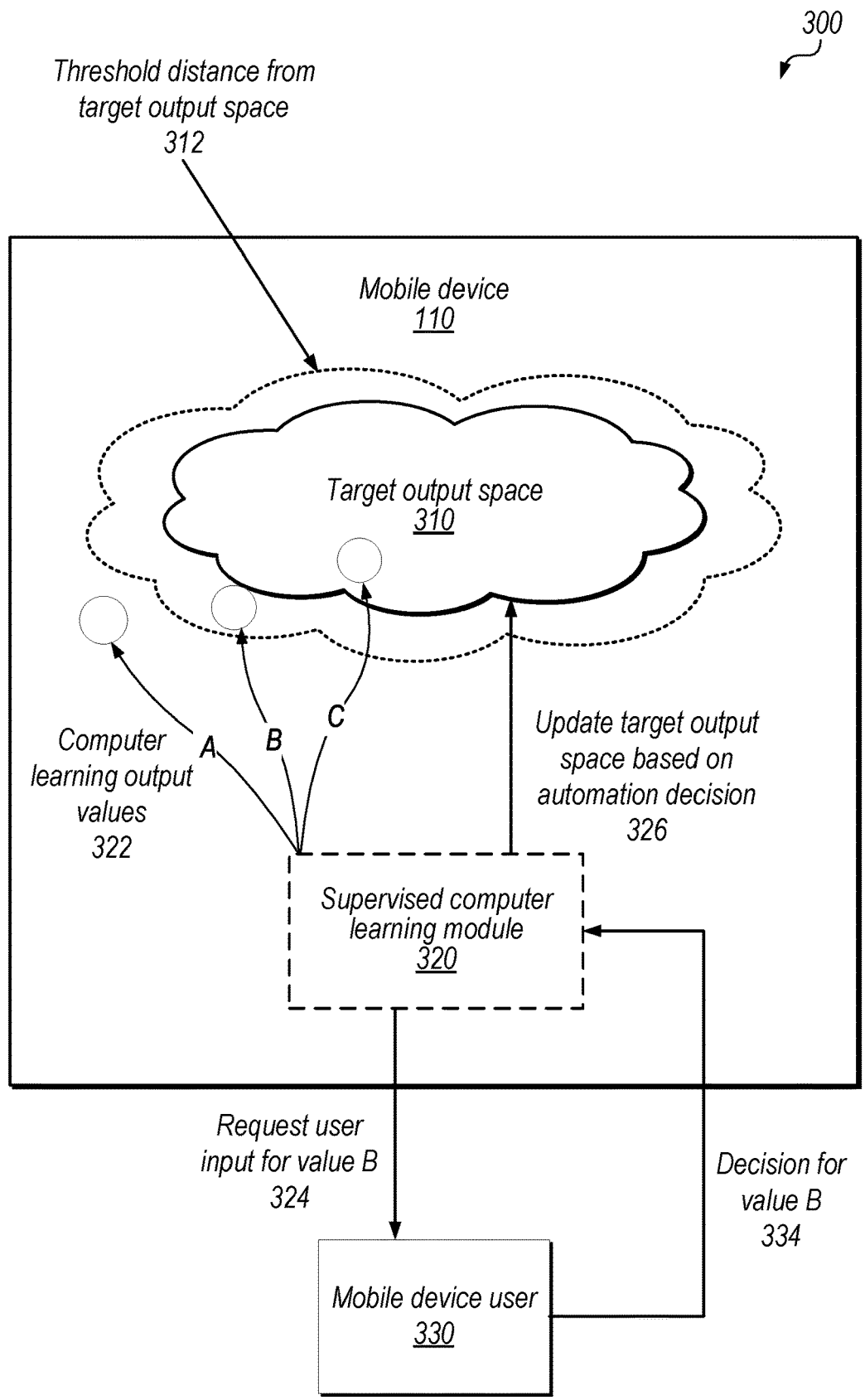
FIG. 3 is a block diagram illustrating an exemplary computer learning module that is at least partially supervised and that automates authentication decisions based on a target output space, according to some embodiments.
Figure 4:
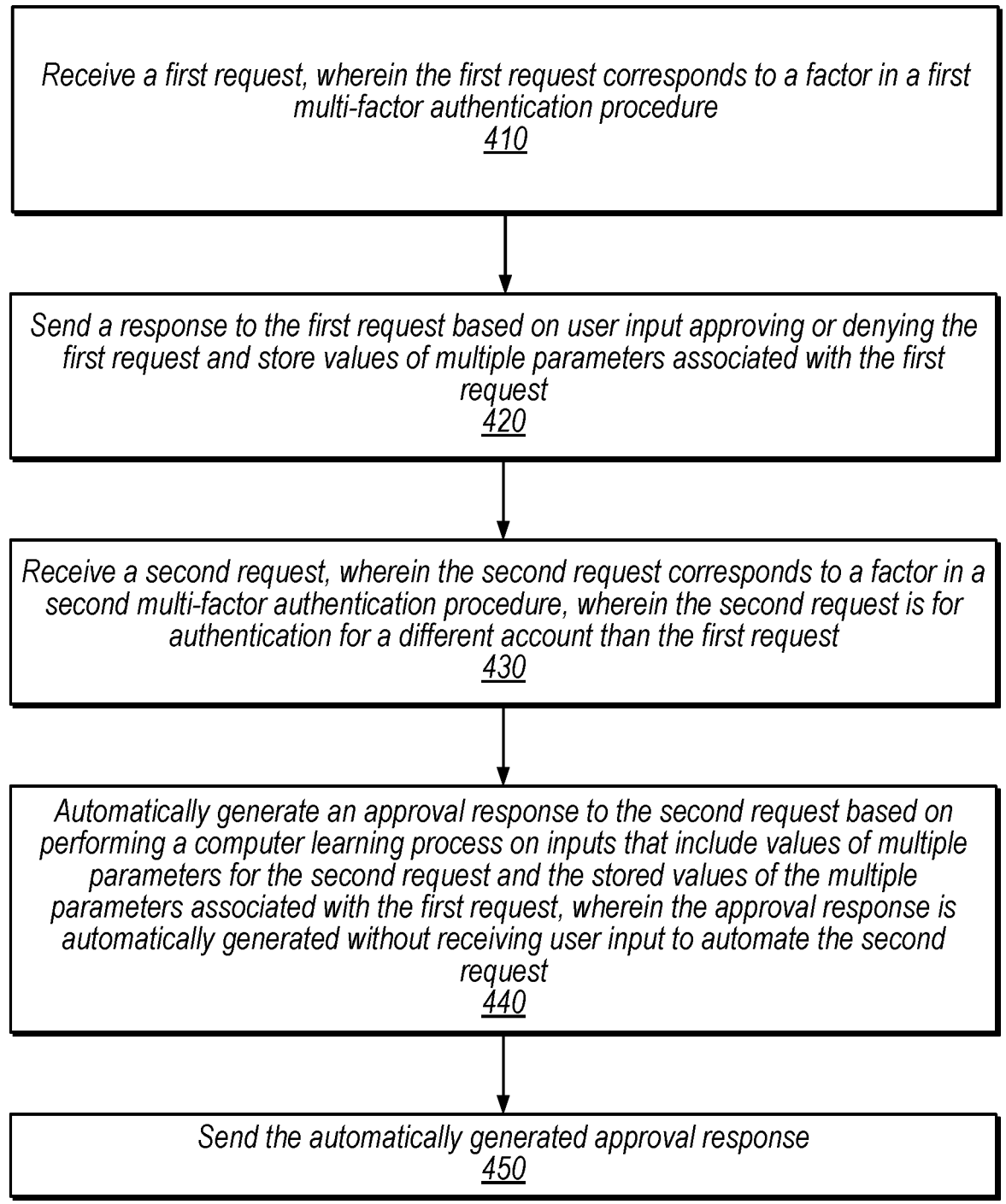
FIG. 4 is a flow diagram illustrating an exemplary method for automating authentication decisions for different accounts without user input, according to some embodiments.
Figure 5:
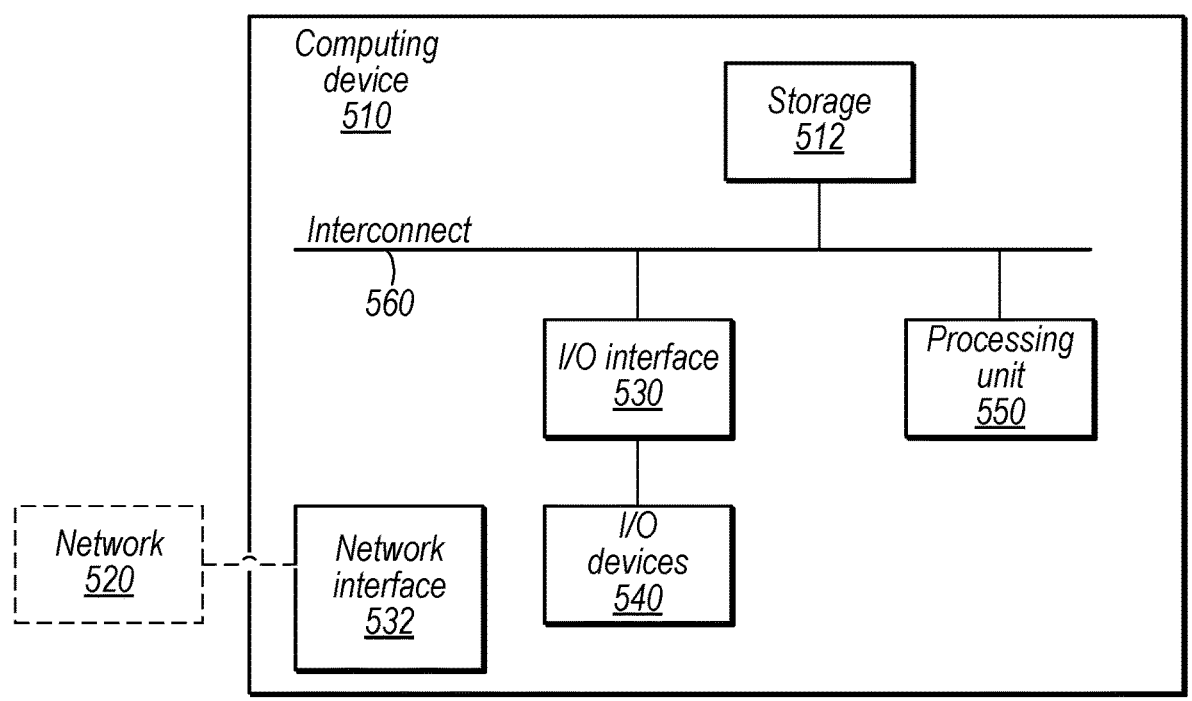
FIG. 5 is a block diagram illustrating an exemplary computing device, according to some embodiments.

This disclosure initially describes, with reference to FIG. 1, exemplary automation of authentication decisions in multi-factor authentication schemes. Input parameters to a mobile device are discussed with reference to FIG. 2. FIG. 3 shows an embodiment of a supervised computer learning module. FIG. 4 illustrates an exemplary method and FIG. 5 shows an exemplary computing device.

Example Authentication Server

Figure 1B:
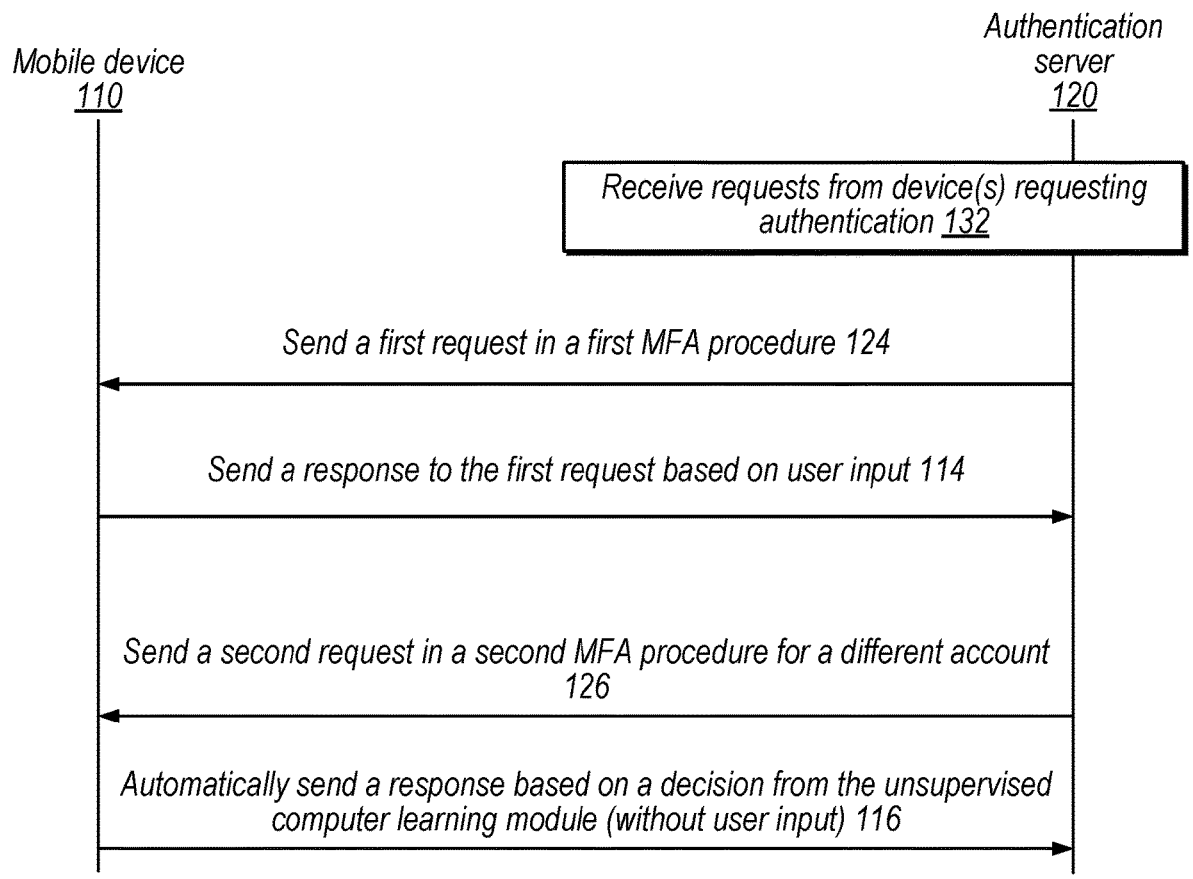

FIGS. 1A and 1B are diagrams illustrating exemplary communication between a mobile device and an authentication server in a multi-factor authentication procedure involving automated authentication decisions based on an unsupervised computer learning process, according to some embodiments. In the illustrated embodiment, system 100 includes mobile device 110, authentication server 120 and devices 130.

In FIG. 1A, mobile device 110 receives user input 140 and environment input(s) 150. The user input 140 received by the mobile device 110 may include but is not limited to one or more of the following: application activity, short message service (SMS) messaging activity, frequency of login, unlock information (e.g., a passcode, biometric information, etc.), and/or other personally identifiable information (PII). Environmental input may include, but is not limited to one or more of the following: time of day, proximity to other devices, biometric information from a wearable device, known user wearing a wearable device, whether a wearable device is unlocked, location of mobile device 110, location of devices in proximity to the mobile device 110, etc.

In the illustrated embodiment, one or more devices 130 request authentication of a user from authentication server 120 (e.g., based on a user attempting to access an account on one of the devices) and the authentication server 120 communicates with mobile device 110 for a factor in the multi-factor authentication process for the user. In the illustrated embodiment, mobile device 110 includes unsupervised computer learning module 112. In the illustrated embodiment, the unsupervised computer learning module 112 determines whether to send automatic response(s) 160 to authentication server 120. (Note that the user may be prompted for a response in instances where module 112 does not provide an automatic response). In some embodiments, the unsupervised computer learning module stores parameter values based on user input 140 and/or environmental input(s) 150. In some embodiments, the parameter values may be stored in a processed format. In some embodiments, module 112 sends automatic response(s) 160 to authentication server based on past and/or current parameter values corresponding to one or more inputs 140 and/or input(s) 150. Based on responses from mobile device 110 (and/or a device 130), the authentication server 120 may authenticate the user.

As used herein, the term "unsupervised computer learning" refers to situations where the user of a mobile device does not indicate to automate decisions or indicate whether unsupervised decisions made by the computer learning process are correct or not. That is, in some embodiments, the unsupervised computer learning process learns when to automate on its own, without user input. One example of unsupervised computer learning involves the module clustering groups of one or more parameters (e.g., frequency of login, wireless signatures, etc.) based on an association with a valid user logging into one or more accounts. In some embodiments, the unsupervised computer learning module on one or more mobile devices becomes unique to the mobile device it is stored on due to training based on different values for various input parameters to the one or more mobile devices. In some embodiments, the learning module may be transferred to another device, e.g., when the user upgrades their mobile phone. In some embodiments, the entire process from receiving a request from the authentication server 120 to sending an automated response from the mobile device 110 is unsupervised.

In some embodiments, all or a portion of the unsupervised computer learning module is implemented as program code stored on a secure circuit. A secure circuit may limit the number of ways that the stored program code may be accessed (e.g., by requiring a secure mailbox mechanism). Examples of secure circuits include the secure enclave processor (SEP) and the trusted execution environment (TEE) processor. In some embodiments, an SEP or a TEE processor is used to store data securely, e.g., by encrypting stored data and by limiting access to itself (e.g., the SEP or TEE processor are isolated from the main processor on the mobile device).

FIG. 1B is a communications diagram illustrating exemplary messages between the authentication server 120 and mobile device 110, according to some embodiments. At 132, in the illustrated embodiment, authentication server 120 receives requests from one or more devices requesting authentication in order to access an account. In some embodiments, the requests received at block 132 are from mobile device 110 (e.g., device 130 and device 110 may be the same device). At 124, in the illustrated embodiment, authentication server 120 sends a first request in a first multi-factor authentication procedure. At 114, in the illustrated embodiment, mobile device 110 sends a response to the first request based on user input. In some embodiments, the response at 114 does not include user input specifying whether to automate future authentication requests.

At 126, in the illustrated embodiment, authentication server 120 sends a second request in a second multi-factor authentication procedure to mobile device 110. In some embodiments, the request sent at 126 is for authentication of the user for a different account than the request sent at 124. At 116, in the illustrated embodiment, mobile device 110 automatically sends a response to authentication server 120 based on a decision from the unsupervised computer learning module, without requesting or receiving any user input associated with the second request.

In some embodiments, the request that is being automated on the mobile device 110 is for two different accounts. In some embodiments, the two different accounts (e.g., account A and account B) are for two different services (e.g., an email service and an online shopping service). In some embodiments, the two different accounts (e.g., a personal account and a business account) are for the same service (e.g., an email service). In some embodiments, two different requests, for which at least one response is automated on the mobile device 110, are for the same account and for the same service.

Various techniques for automating responses for factors in multi-factor authentication schemes are discussed in previously filed U.S. patent application Ser. No. 14/849,312, filed on Sep. 9, 2015. In the previously filed application, automating authentication decisions is performed after user input is received indicating that future authentication decisions should be automated. In disclosed embodiments, a computer learning process is used to automate decisions for one or more factors in multi-factor authentication schemes without receiving any input from a user regarding automation. Further, in disclosed embodiments, an unsupervised computer learning process is used to automate authentication decisions on a mobile device for different accounts/services that the user of the mobile device is attempting to login to/access.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Parameters

Figure 2:
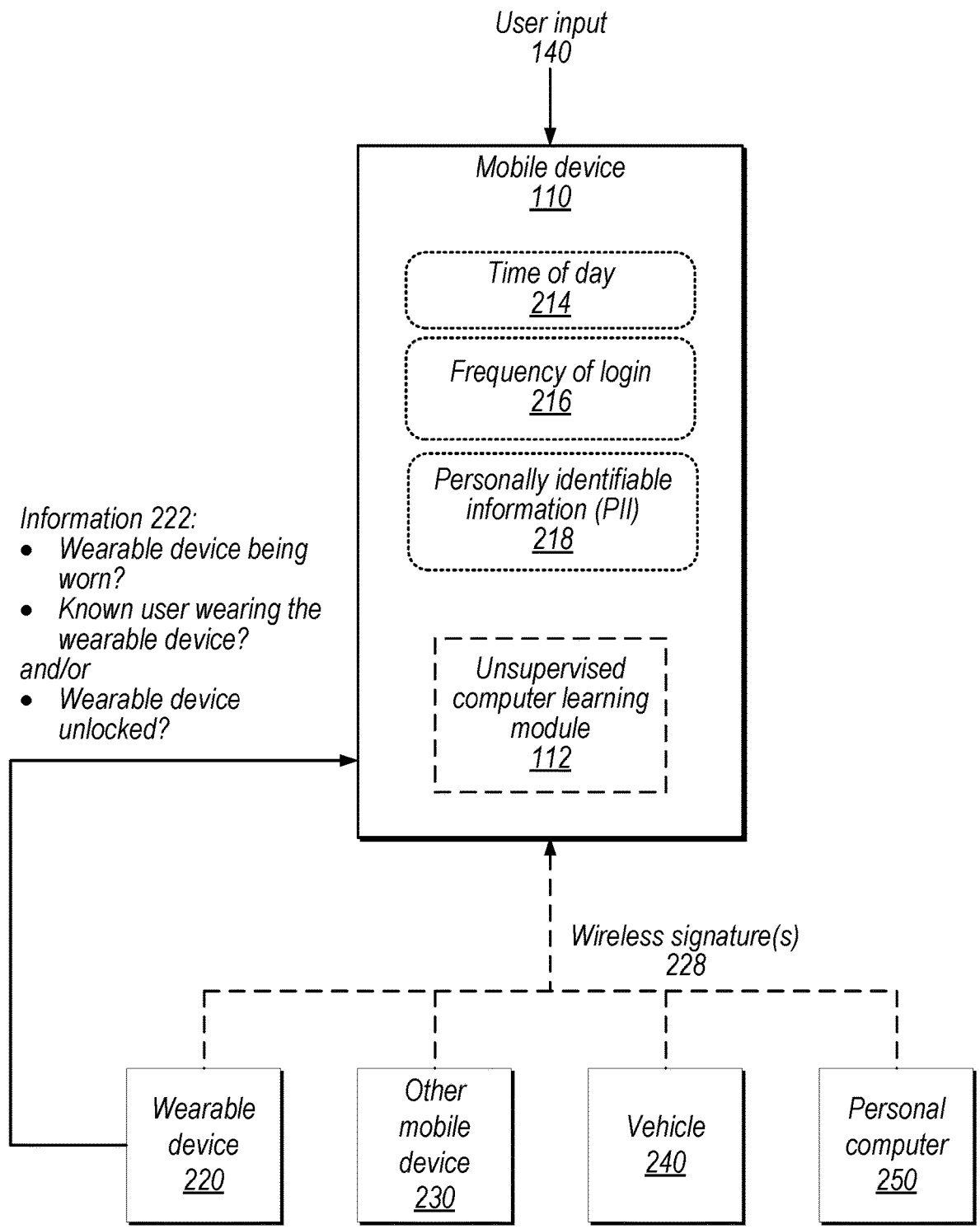
FIG. 2 is a block diagram illustrating exemplary input parameters to a mobile device from multiple different sources, including environmental parameters and parameters already stored on the mobile device, according to some embodiments.

FIG. 2 is a block diagram illustrating exemplary input parameters to a mobile device from multiple different sources, including environmental parameters and parameters already stored on the mobile device, according to some embodiments. In the illustrated embodiment, mobile device 110 receives user input 140 and information from wearable device 220, other mobile device 230, vehicle 240, and personal computer 250.

Mobile device 110, in the illustrated embodiment, stores values for the following parameters: time of day 214, frequency of login 216, and personally identifiable information (PII) 218. In some embodiments, time of day 214 is received in one or more formats (e.g., a different time zone depending on location, 24-hour time, coordinated universal time (UTC), etc.). In some embodiments, frequency of login 216 information includes the number of times the mobile device user logs into: the mobile device, one or more applications, one or more accounts, one or more services, a set of multiple different accounts, etc. In some embodiments, the frequency of login 216 is related to the time of day 214. For example, in some embodiments, the frequency of login 216 information is determined for specified time intervals (e.g., 10 am to 2 pm), for certain days in a week (e.g., only weekdays), over multiple intervals of different lengths (e.g., the last hour or three hours), etc. In some embodiments, PII 218 includes information such as the user's: name, date of birth, biometric records, relatives' names, medical information, employment history, etc. In some embodiments, PII 218 is stored on mobile device 110 and is not available to authentication server 120. In these embodiments, automating decisions based on this information at the mobile device may improve automation accuracy, relative to automation techniques at authentication server 120.

In some embodiments, parameters 214, 216, and 218 are stored internally on mobile device 110 in the format they are received or determined. In some embodiments, processed values (e.g., vectors) may be stored based on these parameters, e.g., after processing by module 112.

As discussed above, certain PII may not be available on the server side. Including PII from the mobile device 110 in server-side authentication decisions would require sending this information from the mobile device to the authentication server 120. This may be undesirable because of the sensitivity of such information and because of regulation. For example, data privacy regulations may specify that PII should not be transmitted to any other computing devices (e.g., the information must remain on the device it originated from). Therefore, it may be advantageous to keep PII securely stored on device 110 to comply with such regulations. Therefore, in some disclosed embodiments, automation decisions are made on mobile device 110. In these embodiments, PII 218 values may never leave mobile device 110 and are used by unsupervised computer learning module 112 in automating authentication decisions.

In the illustrated embodiment, mobile device 110 receives information 222 from wearable device 220. In the illustrated embodiment, information 222 indicates whether device 220 is currently being worn. In addition, in the illustrated embodiment, information 222 indicates whether a known user (e.g., the user of the mobile device 110) is wearing device 220. In the illustrated embodiment, information 222 indicates whether or not device 220 is unlocked. In various embodiments, any combination of the three sets of information contained in information 222 from wearable device 220 may be stored on mobile device 110 and processed by module 112. Although three status indicators are shown in information 222 for purposes of illustration, one or more of these indicators may be omitted and/or other indicators may be included. The illustrated examples of information from wearable device 220 are not intended to limit the scope of the present disclosure.

In the illustrated embodiment, mobile device 110 receives wireless signature(s) 228 from devices 220 and 230, vehicle 240, and personal computer 250. In some embodiments, a wireless signature from one or more of these sources is a Bluetooth low energy (BLE) signature, a WLAN signature, a cellular signature, or a near-field communication (NFC) signature. A wireless signature may include information that is detectable before and/or after connecting with a corresponding device. Further, a wireless signature may include information that is intentionally transmitted by the corresponding device (e.g., a transmitted identifier such as a MAC address) and other types of information (e.g., wireless characteristics of the device related to its physical configuration). In some embodiments, BLE beacon devices transmit a universally unique identifier that informs mobile device 110 that one or more devices are nearby, without connecting, e.g., through BLE, to these devices. In some embodiments, NFC signatures involve short-range radio waves that allow mobile device 110 to determine that another NFC device is a short distance away.

In some embodiments, a wireless signature from a personal computer 250 informs mobile device 110 that it is at the residence of the user (e.g., the mobile device is nearby their desktop PC which is inside their residence). In some embodiments, a wireless signature 228 from vehicle 240 informs mobile device 110 that it is near vehicle 240, which may be an indicator that the device has not been stolen. In some embodiments, a wireless signature 228 from other mobile device 230 informs mobile device 110 that it is near another commonly used device (e.g., if device 230 is a tablet owned by the user of mobile device 110). In various embodiments, the values of wireless signatures from one or more devices are used by a computer learning module to determine whether to automate one or more authentication decisions in a multi-factor authentication procedure. In disclosed embodiments, mobile device 110 may not know the type or identification of a device whose signature it recognizes, but may simply recognize whether the signature is present or not during authenticating procedures, which may be used as an automation criterion. In some embodiments, if mobile device 110 detects wireless signatures from multiple known devices at the same time (e.g., from wearable device 220 and vehicle 240), the unsupervised computer learning module 112 may be more likely to automate authentication decisions.

Example with Partially-Supervised Computer Learning Module

Various embodiments of an unsupervised computer learning process are discussed above. However, as noted above, unsupervised computer learning techniques may be combined with other computer learning techniques to provide automation decisions in multi-factor authentication schemes. In particular, a user may be asked for inputs in certain circumstances where automation should likely be performed but cannot be determined with a threshold degree of certainty. In some embodiments, the system requests input from a user for certain values output from the unsupervised computer learning module that are within a threshold distance from a desirable target output space.

In some embodiments, a multi-factor authentication procedure uses an unsupervised computer learning mode in automating authentication decisions for the entire procedure. However, in some embodiments, automation for a multi-factor authentication procedure reverts to a supervised mode in certain circumstances (e.g., for uncertain output values).

FIG. 3 is a block diagram illustrating an exemplary supervised computer learning module that automates authentication decisions based on a target output space, according to some embodiments. In the illustrated embodiment, system 300 includes mobile device 110 and mobile device user 330.

In the illustrated embodiment, mobile device 110 includes supervised computer learning module 320 with target output space 310. In the illustrated embodiment, target output space 310 is shown outside of module 320 for discussion purposes. However, in some embodiments, the dimensions of target output space 310 are stored inside module 320 and module 320 checks outputs internally. Note that output space 310 may be a multi-dimension space and module 320 may output a vector in the space. This type of output may be typical for neural networks, for example, but similar techniques may be used for other types of computer learning algorithms with different types of outputs. The embodiment of FIG. 3 is shown for purposes of illustration and is not intended to limit the type of computer learning used in other embodiments.

In the illustrated embodiment, supervised computer learning module 320 outputs vectors 322 (i.e., values A, B, and C) based on the automation parameter values received from mobile device 110. In some embodiments, supervised computer learning module 320 evaluates values 322 as they relate to target output space 310. At 312, in the illustrated embodiment, the dotted outline represents a threshold distance from the target output space 310. In the illustrated embodiment, value A is outside space 310, value B is within a threshold distance from space 310, and value C is inside space 310.

At 324, in the illustrated embodiment, supervised computer learning module 320 sends a request to mobile device user 330 for input concerning computer learning output value B. At 334, in the illustrated embodiment, user 330 sends a decision to module 320 for value B. In the illustrated embodiment, at 326, module 320 updates the target output space 310 based on the decision for value B received at 334 from mobile device user 330. Note that the decision 334 may not include input from the user for future automation but may only include a decision for one particular value as requested by module 320.

In some embodiments supervised computer learning techniques may be implemented, in addition to or in place of the unsupervised techniques discussed herein. In some embodiments, supervised computer learning involves a set of "training" values. For example, a supervised computer learning module is provided a predetermined set of values for which the correct outputs are known. In this example, based on those values, the supervised computer learning process generates outputs and compares them with the set of training values. If the generated outputs match the training outputs (e.g., a direct match or within some threshold), the supervised computer learning process may be considered trained (although additional training may continue afterwards). If the values are different, the supervised computer learning process adjusts one or more internal parameters (e.g., adjusting weights of neural network nodes, adjust rules of a rule-based algorithm, etc.). Note that the adjustments to target output space 310 discussed above are supervised in the sense that user input is required, but does not actually result in training of module 320, but merely adjusting target outputs. In other embodiments, user input may be used to train module 320 in a supervised fashion.

Exemplary Methods

FIG. 4 illustrates an exemplary method for automating authentication decisions for different accounts without user input, according to some embodiments. The method shown in FIG. 4 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 410, in the illustrated embodiment, a mobile phone receives a first request, wherein the first request corresponds to a factor in a first multi-factor authentication procedure.

At 420, in the illustrated embodiment, the mobile device sends a response to the first request based on user input approving or denying the first request and stores values of multiple parameters associated with the first request.

At 430, in the illustrated embodiment, the mobile device receives a second request, wherein the second request corresponds to a factor in a second multi-factor authentication procedure, wherein the second request is for authentication for a different account than the first request. In some embodiments, the different account for the second request is for a different service than the account for the first request.

At 440, in the illustrated embodiment, an unsupervised computer learning module on the mobile device automatically generates an approval response to the second request based on performing a computer learning process on inputs that include values of multiple parameters for the second request and the stored values of the multiple parameters associated with the first request, wherein the approval response is automatically generated without receiving user input to automate the second request. In some embodiments, the multiple parameters include a frequency of login parameter that indicates how often the user of the mobile device logs into a set of one or more accounts. In some embodiments, the multiple parameters include a wearable device parameter that indicates whether a wearable device is being worn by the user of the mobile device and whether the wearable device is unlocked. In some embodiments, the multiple parameters include one or more parameters that indicate personally identifiable information (PII) that is stored on the mobile device that is not shared with other devices. In some embodiments, the multiple parameters include a wireless signature parameter based on wireless signatures of one or more nearby devices. In some embodiments, the computer learning process is an unsupervised computer learning process. In some embodiments, the wireless signature is a Bluetooth Low Energy (BLE) signature. In some embodiments, program code for the computer learning process is stored on a secure circuit.

In some embodiments, the computer learning process outputs one or more values and a determination whether to automate is based on whether one or more values output from the computer learning process are in a target output space. In some embodiments, the computer learning process requests user input indicating whether or not to automate in response to determining that the one or more values are outside the target output space but within a threshold distance from the target output space. In some embodiments, the computer learning process updates the target output space in response to the user selecting to automate. In other embodiments, the computer learning process may train itself based on explicit user input.

At 450, in the illustrated embodiment, the mobile device sends the automatically generated approval response.

In some embodiments, an authorization decision is based at least in part on detecting close proximity or physical contact of one or more devices, e.g., using short-range wireless technology. In some embodiments, the short-range wireless technology is near-field communication (NFC). In some embodiments, short-range wireless technology is used for one or more factors in a multi-factor authentication process. In a multi-factor authentication procedure, a factor relating to possession and intentionality (possession of one or more of the devices in short-range communication and intention to move the devices near each other) may be used as an additional factor to knowledge (e.g., of a username and password) and possession (e.g., using the automated techniques discussed herein), in various embodiments. This example embodiment may be referred to as three-factor authentication (e.g., with two possession-related factors and one knowledge-related factor) or two-factor authentication (e.g., grouping the intentional and automated possession techniques as a single factor).

A short-range wireless device may be embedded in a user's clothing, for example. In this example, upon receiving a request for a factor in a multi-factor authentication process, the user taps the mobile device against their short-range wireless enabled clothing. The device may provide limited-use passcodes or other identifying data that the mobile device then provides to the authentication server. The authentication server may, in certain scenarios, authenticate only if this short-range wireless exchange is confirmed. In this example, the user is intentionally employing short-range wireless technology for a factor (e.g., a possession factor) in a multi-factor authentication procedure.

In some embodiments, using short-range wireless technology in a multi-factor authentication procedure advantageously improves the level of security for certain high-security transactions. Note that short-range wireless technology may be used for a factor even when disclosed automation techniques are not involved (e.g., user input is received for the factor) in a multi-factor authentication procedure. However, in some embodiments, short-range wireless communications (e.g., NFC-enabled clothing) are used as another input parameter to the computer learning process.

Exemplary Computing Device

Turning now to FIG. 5, a block diagram of a computing device (which may also be referred to as a computing system) 510 is depicted, according to some embodiments. Computing device 510 may be used to implement various portions of this disclosure. Computing device 510 is one example of a device that may be used as a mobile device, a server computer system, a client computer system, or any other computing system implementing portions of this disclosure.

Computing device 510 may be any suitable type of device, including, but not limited to, a personal computer system, desktop computer, laptop or notebook computer, mobile phone, mainframe computer system, web server, workstation, or network computer. As shown, computing device 510 includes processing unit 550, storage subsystem 512, and input/output (I/O) interface 530 coupled via interconnect 560 (e.g., a system bus). I/O interface 630 may be coupled to one or more I/O devices 540. Computing device 510 further includes network interface 532, which may be coupled to network 520 for communications with, for example, other computing devices.

Processing unit 550 includes one or more processors, and in some embodiments, includes one or more coprocessor units. In some embodiments, multiple instances of processing unit 550 may be coupled to interconnect 560. Processing unit 550 (or each processor within processing unit 550) may contain a cache or other form of on-board memory. In some embodiments, processing unit 550 may be implemented as a general-purpose processing unit, and in other embodiments it may be implemented as a special purpose processing unit (e.g., an ASIC). In general, computing device 510 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 512 is usable by processing unit 550 (e.g., to store instructions executable by and data used by processing unit 550). Storage subsystem 512 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 512 may consist solely of volatile memory in some embodiments. Storage subsystem 512 may store program instructions executable by computing device 510 using processing unit 550, including program instructions executable to cause computing device 510 to implement the various techniques disclosed herein.

I/O interface 530 may represent one or more interfaces and may be any of various types of interfaces configured to couple to and communicate with other devices, according to various embodiments. In some embodiments, I/O interface 530 is a bridge chip from a front-side to one or more back-side buses. I/O interface 530 may be coupled to one or more I/O devices 540 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

It is noted that the computing device of FIG. 5 is one embodiment for demonstrating disclosed concepts. In other embodiments, various aspects of the computing device may be different. For example, in some embodiments, additional components, or multiple instances of the illustrated components may be included.

This specification includes references to "one embodiment," "other embodiments," "some embodiments," or "an embodiment." The appearances of these phrases do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    receiving, by a server system, a login request, wherein the login request corresponds to a first factor in a multi-factor authentication (MFA) procedure;
    requesting, by the server system and in response to the login request, a response from a mobile device corresponding to a second factor in the MEA procedure;
    receiving, by the server system, a response token from the mobile device, wherein the response token comprises:
        an MFA token automatically generated by a machine learning module at the mobile device based on MFA data received from the server system and without receiving input from a user of the mobile device to automate the MFA token; and
        one or more context values of the mobile device;
    determining, by the server system, that the MEA token is valid and that at least one of the one or more context values complies with a login policy; and
    sending, by the server system, an approval response to the login request.

2. The method of claim 1, wherein at least one of the context values is one of: type of device, proximity to another device, location of device, time of day, current weather, and signal strength.

3. The method of claim 1, further comprising, prior to receiving the login request:
    training, by the server system a plurality of machine learning modules using different context values of a plurality of mobile devices; and
    transmitting, by the server system to the mobile device, a trained machine learning module that is unique to the mobile device based on the training being based on a plurality of context values of the mobile device.

4. The method of claim 1, wherein the mobile device stores at least one value based on the MEA data.

5. The method of claim 4, wherein the MFA token generated by the machine learning module is generated based on the at least one stored value.

6. The method of claim 1, wherein the one or more context values that are received at the server system from the mobile device include a frequency of login parameter that indicates how often the user of the mobile device logs into a set of one or more accounts.

7. The method of claim 1, wherein the one or more context values include a wearable device parameter that indicates whether a wearable device is being worn by the user of the mobile device and whether the wearable device is unlocked.

8. The method of claim 1, wherein the one or more context values include one or more values that indicate personally identifiable information (PII) that is stored on the mobile device that is not shared with other devices.

9. A non-transitory computer-readable medium having instructions stored thereon that are capable of causing a server computing system to implement operations comprising:
    receiving, a login request, wherein the login request corresponds to a first factor in a multi- factor authentication (MFA) procedure;
    evaluating data associated with the login request based on a login policy;
    requesting, in response to the login request, a response from a mobile device corresponding to a second factor in the MFA procedure, the requesting comprising sending MFA data from the server computing system to the mobile device indicating a required level of security based on the login policy;
    receiving a response token from the mobile device, wherein the response token is generated at the mobile device by a machine learning module based on the MEA data and without receiving input from a user of the mobile device to automate the response token; and
    sending an approval response based on the received response token.

10. The non-transitory computer-readable medium of claim 9, wherein the response token is one of:

a null token comprising data which cannot be approved by the server computing system;

an automated token comprising data generated using the machine learning module; and a user token comprising data based on further requested user input.

11. The non-transitory computer-readable medium of claim 10, wherein the generating by the machine learning module is based on the MFA data.

12. The non-transitory computer-readable medium of claim 10, wherein the MFA data comprises one or more context parameters to be used by the machine learning module, wherein the one or more context parameters include environmental parameters for the mobile device.

13. The non-transitory computer-readable medium of claim 9, wherein a context parameter is one of: type of device, proximity to another device, location of device, time of day, current weather, and signal strength.

14. A method comprising:
receiving, by a server system, a login request, wherein the login request corresponds to a first factor in a multi-factor authentication (MFA) procedure;

evaluating, by the server system, data associated with the login request based on a login policy;

requesting, by the server system and in response to the login request, a response from a mobile device corresponding to a second factor in the MFA procedure, the requesting comprising sending security data from the server system to the mobile device indicating a required level of security based on the login policy;

receiving, by the server system, a response token from the mobile device, wherein the response token is generated at the mobile device by a machine learning module based on the security data and without receiving input from a user of the mobile device to automate the response token; and sending, by the server system, an approval response based on the received response token.

15. The method of claim 14, wherein the response token is one of:
a null token comprising data which cannot be approved by the server system;

an automated token comprising data generated using the machine learning module; and a user token comprising data based on further requested user input.

16. The method of claim 15, wherein the generating by the machine learning module is based on the security data.

17. The method of claim 16, wherein the security data comprises one or more context values to be used by the machine learning module, wherein the one or more context values are associated with the mobile device.

18. The method of claim 15, wherein the machine learning module at the mobile device is unique to the mobile device based on training of the machine learning module including training on a plurality of previous context values of the mobile device.

19. The method of claim 18, further comprising:
transmitting, by the server system, to a new mobile device utilized by the user of the mobile device, the machine learning module trained on the plurality of previous context values of the mobile device.

20. The method of claim 15, wherein the mobile device stores at least one value based on the security data, and wherein the generating by the machine learning module is based on the at least one stored value.

* * * * *

UNITED STATES PATENT AND TRADEMARK OFFICE
CERTIFICATE OF CORRECTION

PATENT NO. : 12,301,555 B2  
APPLICATION NO. : 17/461303  
DATED : May 13, 2025  
INVENTOR(S) : Joshua David Alexander et al.

Page 1 of 1

It is certified that error appears in the above-identified patent and that said Letters Patent is hereby corrected as shown below:

In the Claims

In Column 11 (Claim 1), Line 65 please delete "MEA" and insert -- MFA --.

In Column 12 (Claim 1), Line 7 please delete "MEA" and insert -- MFA --.

In Column 12 (Claim 4), Line 27 please delete "MEA" and insert -- MFA --.

In Column 12 (Claim 9), Line 62 please delete "MEA" and insert -- MFA --.

Signed and Sealed this
Tenth Day of June, 2025

Coke Morgan Stewart
*Acting Director of the United States Patent and Trademark Office*